(12) United States Patent
Saitou et al.

(10) Patent No.: US 9,049,129 B2
(45) Date of Patent: Jun. 2, 2015

(54) NODE MONITORING APPARATUS, NODE MONITORING METHOD, AND COMPUTER READABLE MEDIUM

(75) Inventors: Naoki Saitou, Ishikawa (JP); Toshitaka Kawahigashi, Ishikawa (JP); Masaki Matsuda, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 165 days.

(21) Appl. No.: 13/213,745

(22) Filed: Aug. 19, 2011

(65) Prior Publication Data

US 2012/0076001 A1 Mar. 29, 2012

(30) Foreign Application Priority Data

Sep. 29, 2010 (JP) .................................. 2010-218908

(51) Int. Cl.
*H04L 12/26* (2006.01)
*H04L 12/24* (2006.01)

(52) U.S. Cl.
CPC .............. *H04L 41/12* (2013.01); *H04L 43/103* (2013.01); *H04L 41/0213* (2013.01)

(58) Field of Classification Search
USPC ........... 370/242–253; 709/224–226, 232–235
See application file for complete search history.

(56) References Cited

U.S. PATENT DOCUMENTS

| | | | |
|---|---|---|---|
| 2002/0116490 A1* | 8/2002 | Hogg et al. .................... | 709/224 |
| 2005/0094567 A1* | 5/2005 | Kannan et al. ................. | 370/241 |
| 2007/0070894 A1* | 3/2007 | Wang et al. .................... | 370/230 |
| 2008/0016187 A1* | 1/2008 | Neil et al. ...................... | 709/220 |
| 2008/0030198 A1* | 2/2008 | Kawata et al. ................. | 324/426 |
| 2008/0112404 A1* | 5/2008 | Kuri et al. ...................... | 370/389 |
| 2009/0304004 A1* | 12/2009 | Huynh Van et al. ..... | 370/395.31 |
| 2011/0116385 A1* | 5/2011 | Turlington et al. ........... | 370/242 |
| 2011/0258311 A1* | 10/2011 | Saitou et al. ................... | 709/224 |

FOREIGN PATENT DOCUMENTS

| | | |
|---|---|---|
| JP | 10-294749 | 11/1998 |
| JP | 2006178834 | 7/2006 |

OTHER PUBLICATIONS

Pereira-Beardsley, Core vs. Edge: Why It Matters When Choosing a Switch, Jul. 20, 2011, Cisco, 5 pages, http://blogs.cisco.com/smallbusiness/core-vs-edge-why-it-matters-when-choosing-a-switch.*

Japan Patent Office, Office Action, corresponding to Application No. 2010-218908, dated Mar. 24, 2014 (English Translation).

* cited by examiner

*Primary Examiner* — Hoon J Chung
(74) *Attorney, Agent, or Firm* — Hogan Lovells US LLP

(57) ABSTRACT

There is provided a node monitoring apparatus including: a node identification unit that identifies a function of a node present in a network; a parameter setting unit that sets a parameter for monitoring processing on the node in accordance with the function identified by the function identification unit; and a node monitoring unit that performs the monitoring processing on each of the nodes based on the parameter set by the parameter setting unit.

8 Claims, 7 Drawing Sheets

Fig. 3

|  | Small ← CPU performance → Large | | | | | |
|---|---|---|---|---|---|---|
| Small ↑ Packet flow volume ↓ Large | 10 | 9 | 8 | 7 | 6 | 5 |
| | 9 | 8 | 7 | 6 | 5 | 4 |
| | 8 | 7 | 6 | 5 | 4 | 3 |
| | 7 | 6 | 5 | 4 | 3 | 2 |
| | 6 | 5 | 4 | 3 | 2 | 1 |
| | 5 | 4 | 3 | 2 | 1 | 1 |

Fig. 4

| Importance level | Monitoring interval |
|---|---|
| 1 | 60-minute interval |
| 2 | 30-minute interval |
| 3 | 20-minute interval |
| 4 | 15-minute interval |
| 5 | 12-minute interval |
| 6 | 10-minute interval |
| 7 | 7-minute interval |
| 8 | 5-minute interval |
| 9 | 3-minute interval |
| 10 | 1-minute interval |

Fig. 5

| Node functions | Importance level | Monitoring interval |
|---|---|---|
| DNS server | 8 | 5-minute interval |
| WEB server | 10 | 1-minute interval |
| Mail server | 8 | 5-minute interval |
| File server | 6 | 10-minute interval |
| DB server | 8 | 5-minute interval |
| DB client | 8 | 5-minute interval |
| Typical instrument | 4 | 15-minute interval |
| Network instrument | 7 | 7-minute interval |
| Printer | 5 | 12-minute interval |
| Operation server | 3 | 20-minute interval |

Fig. 6

| Day of the week | Time | Importance level | Monitoring interval |
|---|---|---|---|
| Monday | 8:00-11:00 | 3 | 20-minute interval |
| | 11:00-15:00 | 10 | 1-minute interval |
| | 15:00-8:00 | 1 | 60-minute interval |
| Tuesday | 24:00-0:00 | 1 | 60-minute interval |
| ... | ... | ... | ... |

NODE MONITORING APPARATUS, NODE MONITORING METHOD, AND COMPUTER READABLE MEDIUM

CROSS-REFERENCE TO RELATED APPLICATIONS

This application is based on and claims priority under 35 USC 119 from Japanese Patent Application No. 2010-218908 filed Sep. 29, 2010.

BACKGROUND OF THE INVENTION

Field of the Invention

The present invention relates to node monitoring apparatus, node monitoring method, and computer readable medium.

SUMMARY OF THE INVENTION

According to an aspect of the invention, there is provided a node monitoring apparatus including: a node identification unit that identifies a function of a node present in a network; a parameter setting unit that sets a parameter for monitoring processing on the node in accordance with the function identified by the function identification unit; and a node monitoring unit that performs the monitoring processing on each of the nodes based on the parameter set by the parameter setting unit.

BRIEF DESCRIPTION OF THE DRAWINGS

Exemplary embodiments of the present invention will be described in detail based on the following figures, wherein:

FIG. 3 is a table showing a data configuration of an importance level master;

FIG. 4 is a table showing a data configuration of a parameter master;

FIG. 5 is a table showing initial parameters;

FIG. 6 is a table showing monitoring parameters which are set for each node.

DESCRIPTION OF THE PREFERRED EMBODIMENTS

The following will describe a scheme for monitoring a working status of an information processing device (hereinafter referred to as "node") in a network as a first exemplary embodiment of the present invention with reference to the drawings.

Figure 1:
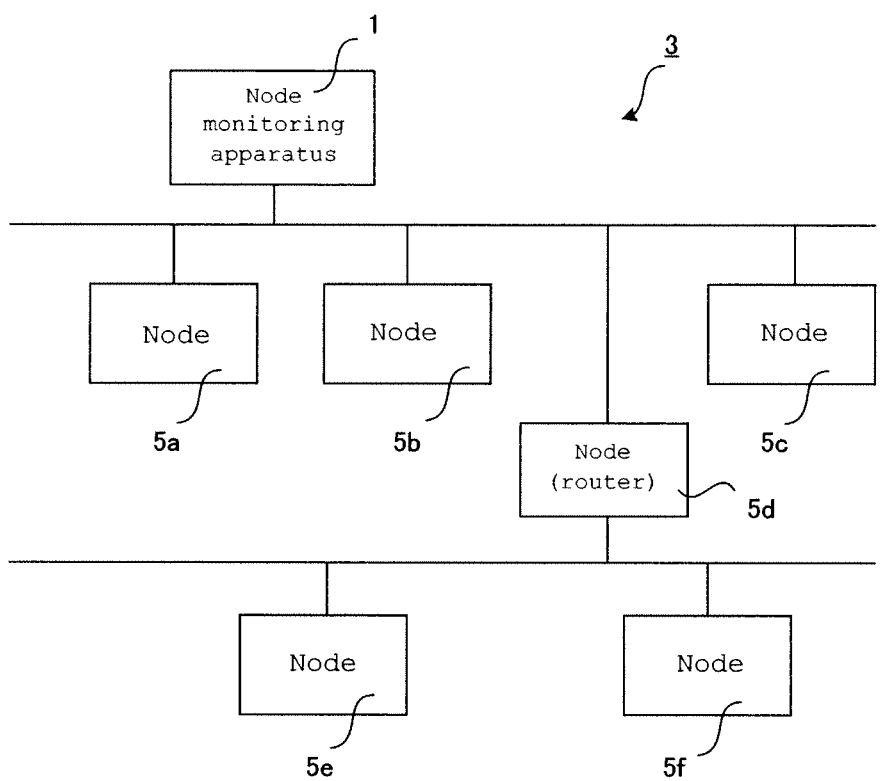
FIG. 1 is a diagram showing an overall configuration of a network system including a node monitoring apparatus in a first embodiment.

FIG. 1 shows an overall configuration of a network system 3 including a node monitoring apparatus 1 according to the first exemplary embodiment.

The network system 3 may be built in, for example, a company and includes the node monitoring apparatus 1 and a plurality of nodes 5a to 5f which are communicably connected to the node monitoring apparatus 1 via a network (intranet, for example).

The node monitoring apparatus 1 searches the network for the nodes 5a to 5f and sets monitoring parameters (for example, monitoring time interval (time interval for monitoring)) necessary in monitoring of the nodes 5a to 5f based on functions (which may be referred to as roles or types) and importance levels (importance levels in tasks, for example) of the respective nodes 5a to 5f. Further, it monitors working statuses of the respective nodes 5a to 5f based on the set monitoring parameters and then updates the monitoring parameters by using results of the monitoring. It is to be noted that the node monitoring apparatus 1 may be considered to use a computer constituted of typical components such as a CPU, an RAM, an ROM, a hard disk drive (HDD), and a communication device.

The nodes 5a to 5f are information processing devices connected to the network and may be considered to be, for example, a DNS server, a WEB server, a mail server, a file server, a DB server, a DB client, a typical instrument, a network instrument, a printer, or an operation server. It is to be noted that in an illustrated example, the node 5d is a router.

Figure 2:
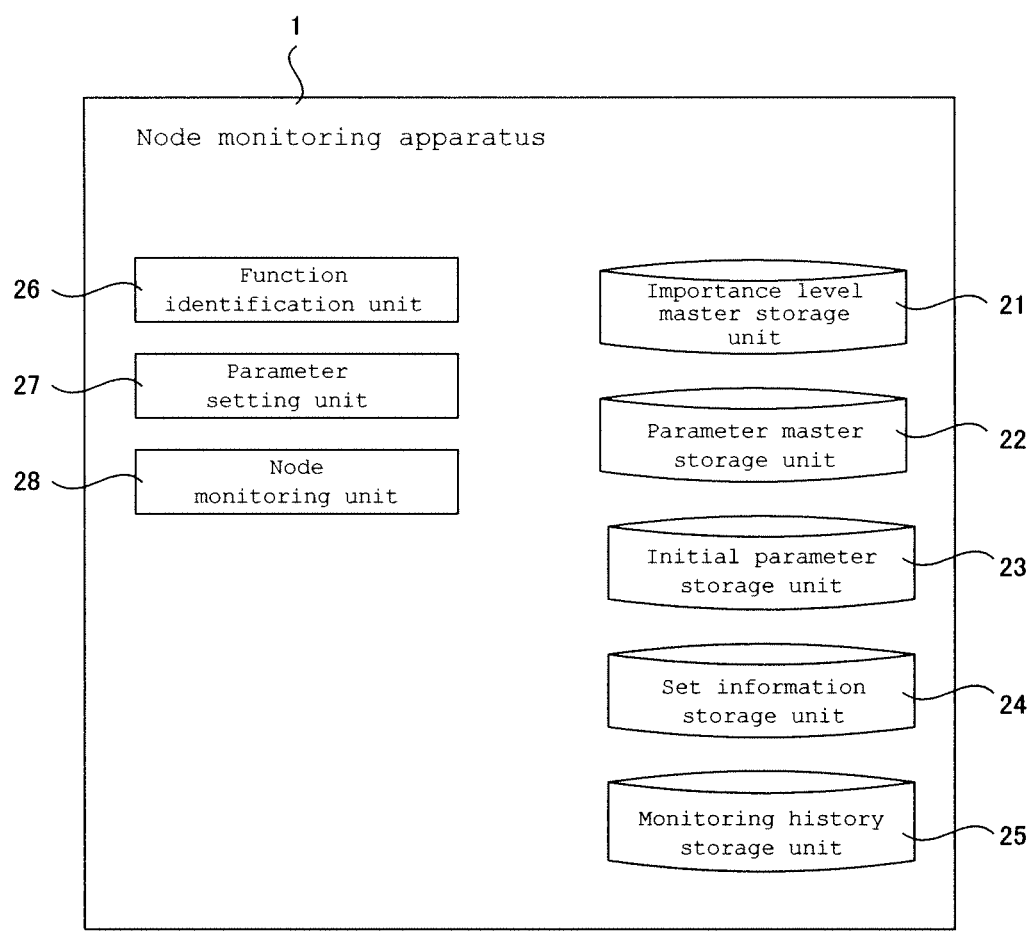
FIG. 2 is a diagram showing a function configuration of the node monitoring apparatus.

FIG. 2 shows a function configuration of the node monitoring apparatus 1. The node monitoring apparatus 1 includes an importance level master storage unit 21, a parameter master storage unit 22, an initial parameter storage unit 23, a set information storage unit 24, a monitoring history storage unit 25, a function identification unit 26, a parameter setting unit 27, and a node monitoring unit 28. Of those functional units, the importance level master storage unit 21, the parameter master storage unit 22, the initial parameter storage unit 23, the set information storage unit 24, and the monitoring history storage unit 25 are realized functionally by using a storage device such as an HDD. Further, the function identification unit 26, the parameter setting unit 27, and the node monitoring unit 28 are functionally realized when the CPU reads predetermined programs stored in the storage device such as an HDD, for example, into the RAM and executes them.

The importance level master storage unit 21 stores a table (hereinafter referred to as "importance level master") necessary to determine an importance level of a task (which may be referred to as a degree of dependence on the task) in each of the nodes 5a to 5f as shown in FIG. 3. Specifically, the importance level master stores CPU performance (CPU utilization ratio, for example), a packet flow volume and an importance level in a condition where they are correlated with each other and is prescribed in such a manner that the more heavily it is involved in the task, that is, for example, the larger the use frequency (values of the respective CPU performance and packet flow volume, in this case), the higher the importance level may become. Further, in the first embodiment, the importance level master storage unit 21 is assumed to store one master for each of the functions (types) of the respective nodes 5a to 5f. Further, for example, in an importance level master corresponding to a specific function (for example, a WEB server or a server and a client having a server/client dependence relationship), stronger involvement in the task than that in the case of the importance level masters corresponding to the other functions is reflected, so that the importance level for the use frequency may be considered to be set higher than the others.

The parameter master storage unit 22 stores a table (hereinafter referred to as "parameter master") that prescribes corresponding relationship between the importance levels of the nodes 5a to 5f and the monitoring parameters (monitoring time interval in an illustrated example) as shown in FIG. 4. In the first embodiment, it is considered that the higher (the closer to "one") the importance level is, the larger the access load becomes. Therefore, in order to suppress the access load, it is prescribed so as to reduce a monitoring frequency (increase the monitoring time interval).

The initial parameter storage unit 23 stores initial values of the importance level and the monitoring parameter (monitoring time interval in this case) for each of the nodes (specifically, function of the node) provided in the network as shown in FIG. 5.

The set information storage unit 24 stores a monitoring date (for example, day of the week and time zone for monitoring), an importance level and a monitoring time interval in condition where they are correlated with each other as the monitoring parameter which is set for each of the nodes 5a to 5f as shown in FIG. 6. It is to be noted that corresponding relationship between the importance level and the monitoring time interval can be known in a parameter master (FIG. 4), so that only either one of the two may be stored in configuration.

The function identification unit 26 searches the network of the network system 3 for the nodes 5a to 5f and identifies the functions (types) and address information (for example, IP addresses) of the respective nodes 5a to 5f by using, for example, a plurality of types of communication protocols. For example, it may be considered that attributes of each of the nodes 5a to 5f such as a class of the working OS (for example, Windows Server, Solaris, or Linux), a service at work (for example, ICMP, SNMP, HTTP, HTTPS, SMTP, POP3, TELNET, FTP, or DNS), a class of a network instrument, if so, (for example, router or hub), a class of a typical instrument, if so, (for example, computer or printer), and a class in the case of a server/client relationship (server or client) are identified and, based on those attributes, the function (type) is identified.

The parameter setting unit 27 sets (and also updates) monitoring parameters in accordance with the identified function and importance level (more specifically, importance level determined on the basis of a use frequency) of each of the nodes 5a to 5f. Specifically, it stores the monitoring parameter in the set information storage unit 24.

The node monitoring unit 28 performs monitoring processing on each of the nodes 5a to 5f by using the corresponding communication protocol based on the set monitoring parameter and stores results of the monitoring in the monitoring history storage unit 25.

Figure 7:
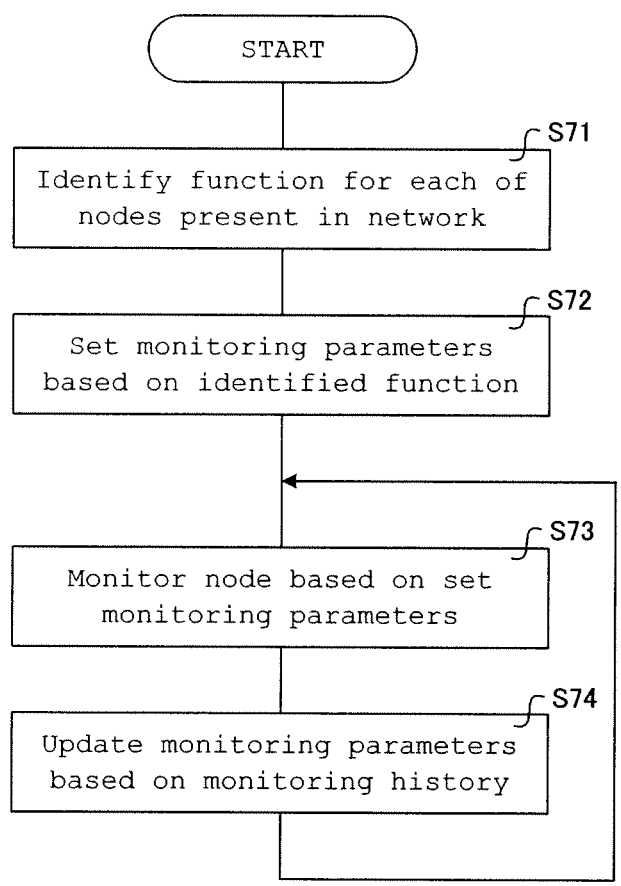
FIG. 7 is a flowchart showing a flow of node monitoring processing by the node monitoring apparatus.

FIG. 7 shows a flow of node monitoring processing by the node monitoring apparatus 1. The following will describe this node monitoring processing with reference to FIG. 7.

First, the function setting unit 26 in the node monitoring apparatus 1 identifies functions (types) and IP addresses of the respective nodes 5a to 5f present in the network of the network system 3 by using, for example, a plurality of types of communication protocols (S71).

Specifically, for example, it may be considered that the attributes of each of the nodes 5a to 5f such as the class of the working OS (for example, Windows Server, Solaris, or Linux), the service at work (for example, ICMP, SNMP, HTTP, HTTPS, SMTP, POP3, TELNET, FTP, or DNS), the class of a network instrument, if so, (for example, router or hub), the class of a typical instrument, if so, (for example, computer or printer), and the class in the case of a server/client relationship (server or client) are identified and, based on those attributes, the function (type) is identified.

More specifically, as for the node function identification method, the function of each of the nodes 5a to 5f may possible be identified as a DNS server in a case where the OS is of the Domain Controller of the Windows or the DNS protocol is working, a Web server in a case where the HTTP or HTTPS is working (results of the HTTP can be obtained for URL specification), a mail server in a case where the POP3 or SMTP is working, a file server in a case where the FTP protocol is working, a DB server in a case where the SQL Server is working, a DB client in a case where the SQL Client is working, a typical instrument in a case where only the ICMP is working, a network instrument in the case of a hub or router, a printer in a case where a management information base (MIB) peculiar to a printer could be obtained, and an operation server in a case where the OS is the Solaris or Linux. It is to be noted the functions of the nodes 5a to 5f may be considered to be identified by the function identification unit 26 at a point in time when the node monitoring apparatus 1 is introduced to the network system 3 or at a predetermined timing after the introduction (for example, periodically).

Further, as for a method for acquiring address information (for example, IP address or MAC address) of the nodes 5a to 5f present in the network, for example, a request such as an ARP or a PARP may possibly be broadcasted so that the address information would be received from the nodes 5a to 5f in response.

Next, the parameter setting unit 27 sets monitoring parameters necessary to perform monitoring processing on the nodes 5a to 5f based on the respective functions of the nodes 5a to 5f identified by the function identification unit 26 (S72). Specifically, it sets monitoring time intervals corresponding to the functions for the respective nodes 5a to 5f by referencing the initial parameters (FIG. 5) (stores them in the set information storage unit 24). It is to be noted that at this setting timing, the monitoring parameters are set so that the monitoring processing may be performed at the thus set monitoring timing irrespective of the date and time, for example. Specifically, it may be considered that a value of "0:00-24:00" would be stored in the column of time for each day of the week in a data configuration of the monitoring parameters in FIG. 6.

Then, the node monitoring unit 28 performs the monitoring processing on the nodes 5a to 5f based on the set monitoring parameters (FIG. 6) (S73) and stores results of the monitoring (for example, monitoring date and use frequency (CPU performance and packet flow volume)) in the monitoring history storage unit 25. It is to be noted that it may be considered that the packet flow volume and the CPU performance would be measured by utilizing SNMP and Windows Management Instrumentation (WMI) respectively (more specifically, a response would be received from each of the nodes 5a to 5f).

Further, if the monitoring results cannot be obtained for any reason (no response is obtained from any one of the nodes 5a to 5f), information (error information) to that effect is stored in the monitoring history storage unit 25. In this case, it may be considered that until the error is solved (for example, an instruction is given by the manager), the monitoring processing is not performed on the relevant node (any one of the nodes 5a to 5f). This enables preventing repetition (retrial) of the monitoring processing, thereby suppressing an increase in load on the network.

As described hereinabove, the node monitoring apparatus 1 identifies the function (type) of the nodes 5a to 5f present in the network, automatically sets the monitoring parameters necessary to perform the monitoring processing, and monitors the nodes 5a to 5f based on those set monitoring parameters. This enables accurately setting the monitoring parameters so that the nodes 5a to 5f can be monitored securely, even if the manager does not know the importance about characteristics and operation tasks of the respective nodes 5a to 5f.

However, the node monitoring apparatus 1 in the first embodiment performs more appropriate monitoring processing in accordance with the working status of each of the nodes 5a to 5f and, therefore, performs the following processing.

Specifically, the parameter setting unit 27 not only sets monitoring parameters based on the function of each of the nodes 5a to 5f identified by the function identification unit 26 but also re-sets (updates) the monitoring parameters based on a monitoring history (information stored in the monitoring history storage unit 25) of each of the nodes 5a to 5f (S74). Such monitoring parameter update processing is considered to be performed at a predetermined time interval (one-hour interval or 24-hour interval), for example.

More specifically, in a case where it is set to perform the monitoring parameter update processing at an interval of one hour, it is supposed that the importance levels (importance levels determined on the basis of the importance level master in FIG. 3) corresponding to a use frequency in any node (anyone of the nodes 5a to 5f) in time zones of, for example, 8:00-9:00, 9:00-10:00, and 10:00-11:00 averages "3". In this case, the monitoring parameters are updated to "day of the week="Monday", time="8:00-11:00", importance level="3", and monitoring interval="20-minute interval" as shown in FIG. 6. It is to be noted that this holds true also with the update processing in any other time zones.

Then, the node monitoring apparatus 1 (specifically, the node monitoring unit 28 and the parameter setting unit 27) repeats the monitoring processing on the nodes 5a to 5f based on those updated monitoring parameters and the monitoring parameter update processing based on results of the monitoring. By repeating the monitoring processing and the monitoring parameter update processing in such a manner, the nodes 5a to 5f can be monitored more appropriately.

As described above, the node monitoring apparatus 1 in the first embodiment has functions to identify the functions etc. of the nodes 5a to 5f present in the network, automatically set the monitoring parameters based on this identified functions, and perform monitoring processing on each of the nodes 5a to 5f and so has an advantage in that an agent need not be introduced into each of the nodes 5a to 5f. Further, the respective functions and monitoring parameters can automatically be identified and set for each of the nodes 5a to 5f, so that it is possible to reduce the burdens on the manager and also appropriately monitor the nodes 5a to 5f in the network irrespective of the knowledge and experiences of the manager.

Although the first embodiment of the present invention has been described hereinabove, the present invention is not limited to the present embodiment and can be modified and applied variously as described below.

[Variants] For example, the node monitoring apparatus 1 may be provided with unit (relationship identification unit) for identifying a dependence relationship of each of the nodes 5a to 5f with the other nodes 5a to 5f, so that the parameter setting unit 27 may set the monitoring parameters in accordance with this identified dependence relationship in addition to the identified functions of the nodes 5a to 5f. It is to be noted that the dependence relationship includes, for example, information that denotes a history of communication between a node (the node 5a, for example) and any other node (any one of the nodes 5b-5f), a communication frequency, and an importance level of a shared task in the case of role sharing among the nodes.

Specifically, it may be considered that the dependence relationship would be identified on the basis of a server/client class among the attributes identified for each of the nodes 5a to 5f. More specifically, for example, in a case where the SQL Server and the SQL client are introduced, those nodes can be identified as having a server/client dependence relationship.

Further, for example, although the first embodiment has employed a communication protocol, a monitoring date, and a monitoring interval as the monitoring parameters, the variant may further employ a time-out value (time limit (number of seconds, minutes, etc.) for waiting for a response from the nodes 5a to 5f to be monitored) or the number of re-trials (the number of times of re-gaining access to the nodes 5a to 5f to be monitored if the monitoring time has run past the time limit).

Further, for example, although in the first embodiment, any one of the nodes 5a to 5f that has a higher use frequency has been considered to have a higher task-related importance level (higher access load) (see FIGS. 3 and 4) so that the monitoring processing might be performed at a lower monitoring frequency (larger monitoring interval) to reduce the access load, conversely, any one of the nodes 5a to 5f that has a higher use frequency may be considered to be an important node having a higher necessity of detecting a problem such as a failure early so that the monitoring processing would be performed at a higher monitoring frequency (smaller monitoring interval).

Further, for example, although in the first embodiment, the node monitoring apparatus 1 has updated the monitoring parameters automatically, the manager may appropriately change the monitoring parameters.

Further, for example, the function of each of the nodes 5a to 5f or its degree of dependence on a task or relationship of dependence on the other nodes 5a to 5f or use frequency may be clarified so that if a failure should occur on any one of the nodes 5a to 5f, switchover (automatic recovery) would be performed to any one of the nodes 5a to 5f that provides the same service (has the same function).

What is claimed is:

1. A node monitoring apparatus comprising:
    a function identifier configured to identify a function of at least one node out of a plurality of nodes present in a network based on a working operating system and a service at work of the node;
    a relationship identifier configured to identify a relationship of dependence of each of the nodes on the other nodes, the relationship of dependence including at least one of a history of communication between a node and any other node, a frequency of communications between nodes, and an importance level of a task shared among at least two nodes;
    a parameter-setter configured to set a parameter for monitoring processing on the node in accordance with the function identified by the function identifier and the dependence relationship identified by the relationship identifier; and
    a node monitor configured to perform the monitoring processing on each of the nodes based on the parameter set by the parameter setter.

2. The node monitoring apparatus according to claim 1, wherein the parameter setter sets the parameter for each node in accordance with its use frequency.

3. The node monitoring apparatus according to claim 1, wherein the function identifier identifies the function of each node by using a plurality of types of protocols.

4. The node monitoring apparatus of claim 1, further comprising an importance level storage unit configured to store importance levels associated with a plurality of days of the week and times of day for each node, and wherein the parameter-setter is further configured to set a monitoring interval based on the stored importance levels.

5. A method for monitoring nodes comprising the steps of:
    identifying a function of at least one node out of a plurality of nodes present in a network with a monitoring apparatus communicably connected to the nodes within the network, wherein the function is identified based on a working operating system and a service at work of the node;

identifying a relationship of dependence of each of the nodes on the other nodes with the monitoring apparatus, the relationship of dependence including at least one of a history of communication between a node and any other node, a frequency of communications between nodes, and an importance level of a task shared among at least two nodes;

setting a parameter for monitoring processing on the node in accordance with the identified function of the node and the identified dependence relationship; and performing the monitoring processing on the node based on the set parameter with the monitoring apparatus.

6. The method of monitoring nodes of claim 5, further comprising storing an importance levels associated with a plurality of days of the week and times of day for each node, and wherein setting the parameter further includes setting a monitoring interval based on the stored importance levels.

7. A non-transitory computer-readable medium storing thereon a computer program used in a computer, the computer program causing the computer to perform the steps of:

identifying a function of at least one node out of a plurality of nodes present in a network based on a working operating system and a service at work of the node;

identifying a relationship of dependence of each of the nodes on the other nodes, the relationship of dependence including at least one of a history of communication between a node and any other node, a frequency of communications between nodes, and an importance level of a task shared among at least two nodes;

setting a parameter for monitoring processing on the node in accordance with the identified function of the node and the identified dependence relationship; and performing the monitoring processing on the node based on the set parameter.

8. The non-transitory computer-readable medium claim 7, further comprising storing an importance level associated with a plurality of days of the week and times of day for each node, and wherein setting the parameter further includes setting a monitoring interval based on the stored importance levels.

* * * * *